(12) United States Patent
Messano

(10) Patent No.: US 6,237,988 B1
(45) Date of Patent: May 29, 2001

(54) STREAMLINE ROOFTOP DECK FOR MOTORHOMES

(76) Inventor: Frank Messano, 2813 Esturion St., La Costa, CA (US) 92009

(*) Notice: Subject to any disclaimer, the term of this patent is extended or adjusted under 35 U.S.C. 154(b) by 0 days.

(21) Appl. No.: 09/491,764

(22) Filed: Jan. 27, 2000

Related U.S. Application Data

(63) Continuation-in-part of application No. 08/929,691, filed on Sep. 15, 1997, now abandoned.

(51) Int. Cl.$^7$ ....................................................... B60P 3/34
(52) U.S. Cl. ........................ 296/165; 296/26.06; 296/210; 52/79.5
(58) Field of Search .................................... 296/210, 162, 296/165, 26.06; 52/29, 79.5; D12/104

(56) References Cited

U.S. PATENT DOCUMENTS

| | | |
|---|---|---|
| 14,657 | 7/1896 | Lawson . |
| D. 149,981 | 6/1948 | Stopa . |
| D. 362,417 | 9/1995 | Curtis . |
| 3,050,330 | 8/1962 | Willson . |
| 3,608,954 | 9/1971 | Lynd . |
| 3,841,036 | 10/1974 | Johnson . |
| 3,971,455 | 7/1976 | Molzon . |
| 4,103,958 | 8/1978 | Parent . |
| 4,371,056 | 2/1983 | Anglade . |
| 4,465,316 | 8/1984 | Roisen . |
| 4,666,204 | 5/1987 | Reinholtz . |
| 4,681,083 | 7/1987 | Shu . |
| 4,981,319 | 1/1991 | Gerzeny . |
| 5,078,441 | 1/1992 | Borskey . |
| 5,374,094 | 12/1994 | Smith . |
| 5,429,405 | 7/1995 | Newbould . |
| 5,445,236 | 8/1995 | Kuhn . |
| 5,655,435 | 8/1997 | Rachesky . |

FOREIGN PATENT DOCUMENTS

| | | | |
|---|---|---|---|
| 14657 | * of 1896 | (GB) | ...................................... 296/165 |
| 2168295 | * 6/1986 | (GB) | ...................................... 296/210 |
| 2196583 | * 5/1988 | (GB) | ...................................... 296/210 |

* cited by examiner

*Primary Examiner*—Dennis H. Pedder

(57) ABSTRACT

A system of adjustable rooftop cowlings, folding safety handrails, hatchways, stairways, and furnishings affixed to the top of motorhomes.

16 Claims, 15 Drawing Sheets

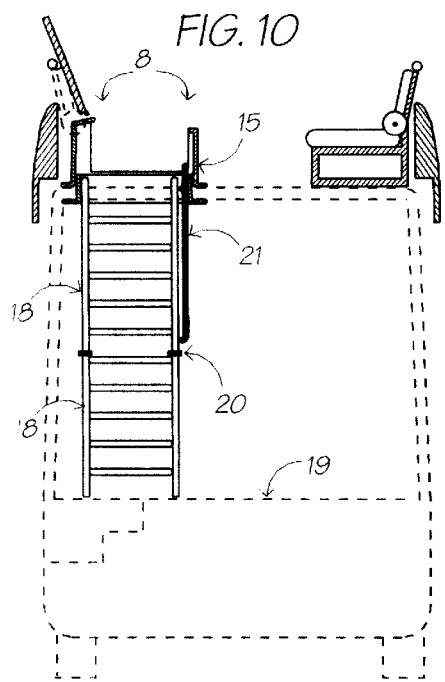
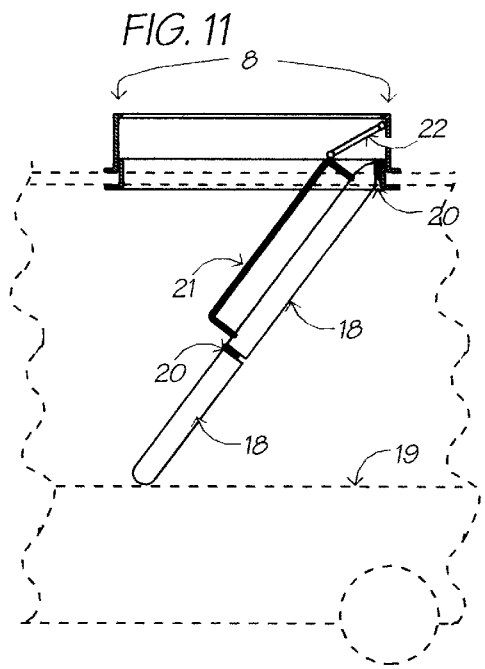
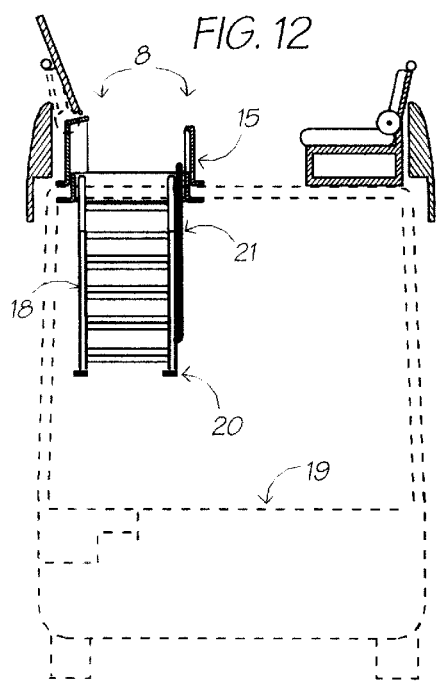
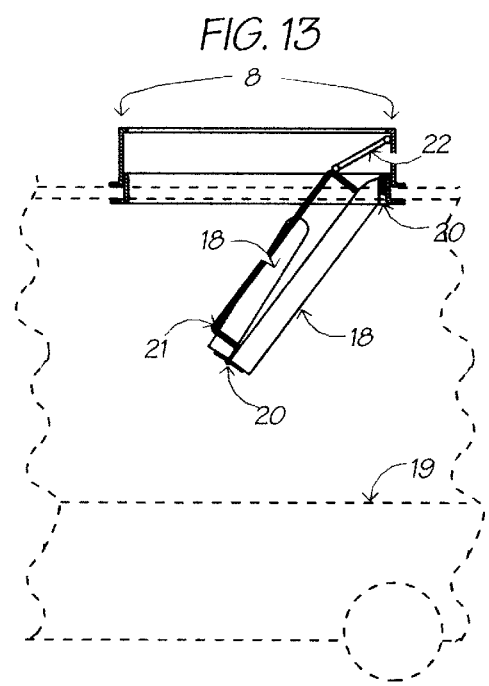

STREAMLINE ROOFTOP DECK FOR MOTORHOMES

This application is a Continuation-in-Part of U.S. Ser. No. 08/929,691 filed Sep. 15, 1997 now abandoned.

BACKGROUND OF THE INVENTION

1. Field of the Invention

This invention relates generally to permanently mounted streamline folding rooftop deck assemblies for motorhomes. More specifically, the present invention relates to permanently affixed folding rooftop furnishings, folding safety handrails, folding hatchways, folding stairways, seamless rooftop decks, and streamline cowlings for motorhome roofs which can easily be fitted to existing and newly manufactured vehicles.

2. Description of Related Art

It is known in the art to attach decks and cabins to the rooftops of mobile homes, campers, housecars, and other recreational land vehicles. It is also known to utilize a hatch or the like to access the rooftop deck from the interior of a recreational vehicle, or from ground level. See, for example, U.S. Pat. No. 3,841,036 (Johnson 1974) and U.S. Pat. No. 3,608,954 (Lynd 1971).

U.S. Pat. No. 3,841,036 (Johnson 1974), which patent applies specifically to flat-roof mobile home trailers that are not intended for regular city and highway travel, discloses the use of a fence with posts around the rooftop perimeter of a mobile home to create an enclosed space for movable outdoor furniture. In addition, the art depicts a hatch from the rooftop to the interior of the mobile home below, and identifies a folding exterior stairway. This patent does not disclose, infer, or show any application of the invention on a high-speed motorhome, nor disclose, infer, or show the application of furniture permanently secured to the rooftop, which folds downward for high-speed travel, nor does it claim any application of the invention for a sloped, crowned, or rounded roof typical of motorhomes.

U.S. Pat. No. 3,608,954 (Lynd 1971) discloses a collapsible rooftop extension for a vehicular cabin which is basically a second roof with three sides which is loosely fitted over the existing roof and sides of campers, mobile homes, housecars and similar structures. This second roof cranks upward to form an enclosed space between the second roof and the existing vehicle roof. This second roof structure telescopes upward by means of cables and cranks to create the enclosed cabin space above the existing vehicle roof. The patent also mentions a collapsible handrail on the non-surrounded areas of the vehicle rooftop, but does not describe it in detail or specific function. This patent does not disclose, infer, or show the application of any rooftop permanently fixed furniture, since its permanent existence would prohibit the collapsible room from closing downward upon the vehicle roof, thus invalidating the utility of the invention. Moreover, this patent does not allow for the use and operation of rooftop air conditioners, rooftop refrigerator heat exhausts, rooftop sewage vent pipes, rooftop satellite dishes and antennae and other rooftop protrusions which are integral to today's typical motorhomes.

The prior art of recreational vehicle rooftop safety handrails and hatchways is not ideally suited for use on thin, lightly constructed roofs of modern high-speed motorhomes in which aesthetic appearance, light weight, low-height, and low-wind resistance of rooftop elements are of prime importance. For example, a chain link fence supported by fence posts (Johnson) may be acceptable for a non-highway traveling mobile home, but is not aesthetically or mechanically suited for the rooftop of a sleek high-speed motorhome.

Finally, the prior art for adding a walking deck surface to the rooftop of existing recreational land vehicles roofs is not suitable for high-speed motorhomes where large-span stiffness, light weight, water tightness, and integral skylights are necessary rooftop attributes. For example, the prior art (Johnson) claims the use of "bricks" for a rooftop surface on mobile homes. While bricks may be an acceptable deck surface for a stationery mobile home roof, the rooftop of a traveling high-speed motorhome has roof surface performance requirements similar to that of an aircraft fuselage surface or the cabin roof surface of a high-speed yacht where rooftop surfaces must add structural and watertight integrity to the roof, while being light in weight and able to perform in high-speed, high-vibration, bumpy, and side rolling conditions. The prior art use of bricks, wooden planks, and other similar household type surfaces is not suitable for today's high-speed motorhomes.

And while the prior art (Johnson and Lynd) mention the general use of a hatch for access from the vehicle interior to the roof without any specificity of shape, form, or performance, there is need of a hatchway specific to the high-speed performance of motorhomes that provides additional structural roof support, ventilation while traveling, and rooftop safety handrails.

Accordingly, there is a need in the art for a lightweight motorhome rooftop deck system comprising an adjustable height rooftop safety handrail apparatus, permanently affixed rooftop furnishings which fold down to a low-height for high-speed travel and raise to normal height for use, a lightweight seamless rooftop deck, a hatchway suitable for high-speed travel, and a streamline cowling around these elements to minimize wind stream disturbance and to provide a sleek aesthetically pleasing structure complimentary to the motorhome appearance, while accommodating the existence of rooftop air conditioners, rooftop refrigerator heat exhausts, rooftop sewage vent pipes, rooftop satellite dishes and antennae which are integral to typical motorhomes.

SUMMARY OF THE INVENTION

The present invention provides a plurality of adjustable motorhome rooftop assemblies which are easily installed by persons not skilled in motorhome manufacturing. The assemblies include a plurality of permanently mounted folding rooftop furniture, a plurality of folding safety handrails, a plurality of streamline cowlings, a plurality of seamless decks, and a plurality of hatchways & stairs which affix to motorhomes.

The folding safety handrails and folding rooftop furniture seat backs lock in a folded down low-profile position for travel, and lock upward for use. The furniture arrangement, lengths and number of units, the streamline cowlings lengths and heights, and the safety handrails lengths and heights permit on-site adjustments to accommodate various motorhome rooftop shapes by relatively unskilled persons. Such adjustments are necessary because the widths, lengths, and surface flatness or crown of motorhome roofs typically differ in dimensions from motorhome manufacturer to motorhome manufacturer, model to model, and differ for various lengths of motorhomes.

In one embodiment, the present invention includes a plurality of sofa furniture with their bench seats of various lengths arranged with their back edges aligned along the rooftop perimeter edges of the motorhome forming an enclosed walking area within the perimeter of the rooftop sofas. The sofa backs fold and lock down for travel, and lock upward for seating use. The safety handrails affixed to the top of the sofa backs also fold and lock down for travel, and lock upward for use . . . the arrangement forming a continuous safety handrail round the perimeter of the rooftop. The hatchway is affixed within the line of sofas along one side of the rooftop to provide access to the interior of the motorhome. The hatchway lid hinge is on the outboard side of the hatchway and is in line with the hinges of the folding furniture of the same line. The lifting of the hatchway lid raises the safety handrail and sofa backs in the line of sofas. Similarly, the line of sofas on the opposite side of the motorhome rooftop have a common safety handrail affixed to their backs which, when raised upward, also raises the sofa backs into position for use. Raising the folded down backs of the sofas across the front and back of the motorhome rooftop raises the remaining safety handrails to fully enclose the perimeter with safety handrails.

The understructure of the furniture is recessed to span over rooftop vents, pipes, air conditioning units, and other projections common to motorhome roofs, without blocking airflow or inhibiting their normal use. Additionally, the understructure affixes the furniture to the rooftop of the motorhome and affixes the streamline cowlings around the perimeter of the motorhome rooftop.

The streamline cowlings around the perimeter of the motorhome rooftop incorporate a flow-through open space between the rooftop and the bottom of the cowlings to allow circulation of air and to allow water and snow to run off from the rooftop. An aspect of this embodiment is that the streamline cowlings inside perimeter is slightly larger than the perimeter of the rooftop, which allows the streamline cowlings to slip over and cover the edges of the motorhome rooftop, and to be adjustable in height by lowering or raising the position of the streamline cowlings during installation to best suit the structure of the motorhome. This flow-through open space eliminates the skill and close tolerances that would otherwise be required to affix streamline cowlings to motorhomes.

In another embodiment, a permanently affixed rooftop folding rooftop sofa-bed, a permanently affixed rooftop folding table, and a permanently affixed folding rooftop food & drink preparation console of modular dimensions are interspersed within the line of sofas.

The present invention also provides a plurality of folding rooftop to ground rear stairways affixable to the exterior rear of the motorhome, which fold flat against the back of the motorhome for travel and which fold outward and downward for use. The rear stairways incorporate safety handrails.

BRIEF DESCRIPTION OF THE DRAWINGS

Other features and advantages of the present invention will be apparent from the following detailed descriptions of preferred embodiments thereof when read in conjunction with reference to the accompanying drawings, wherein:

FIG. 10 is a retractable stairway operational sectional view across the rooftop through the streamline cowlings, through the retractable stair hatchway, and through the folding sofa atop the motorhome of FIG. 9 depicting the hatchway, the folding sofa, the folding safety handrails in their UP position for use, and the retractable stairway in the extended DOWN position for use.

FIG. 11 is a retractable stairway operational sectional side view lengthwise through the retractable stair hatchway of FIG. 10 depicting the retractable stairway in the extended DOWN position for use.

FIG. 12 is a retractable stairway operational sectional view across the rooftop through the streamline cowlings, through the retractable stair hatchway, and through the folding sofa atop the motorhome of FIG. 9 depicting the hatchway, the folding sofa, the folding safety handrails in their UP position for use, and the retractable stairway in the partial retracted position.

FIG. 13 is a retractable stairway operational sectional side view lengthwise through the retractable stair hatchway of FIG. 12 depicting the retractable stairway in the partial retracted position.

DETAILED DESCRIPTION OF THE PREFERRED EMBODIMENTS

The drawings depict typical arrangements of elements to illustrate their application. The actual number of units, their arrangement, and their proportions vary with each application on each motorhome. The number and kind of units depicted, their lengths and widths, and their locations vary depending upon the physical conditions of the motorhome to which they are affixed. The preferred embodiments are not limiting, but illustrate typical types of applications.

Figure 1:
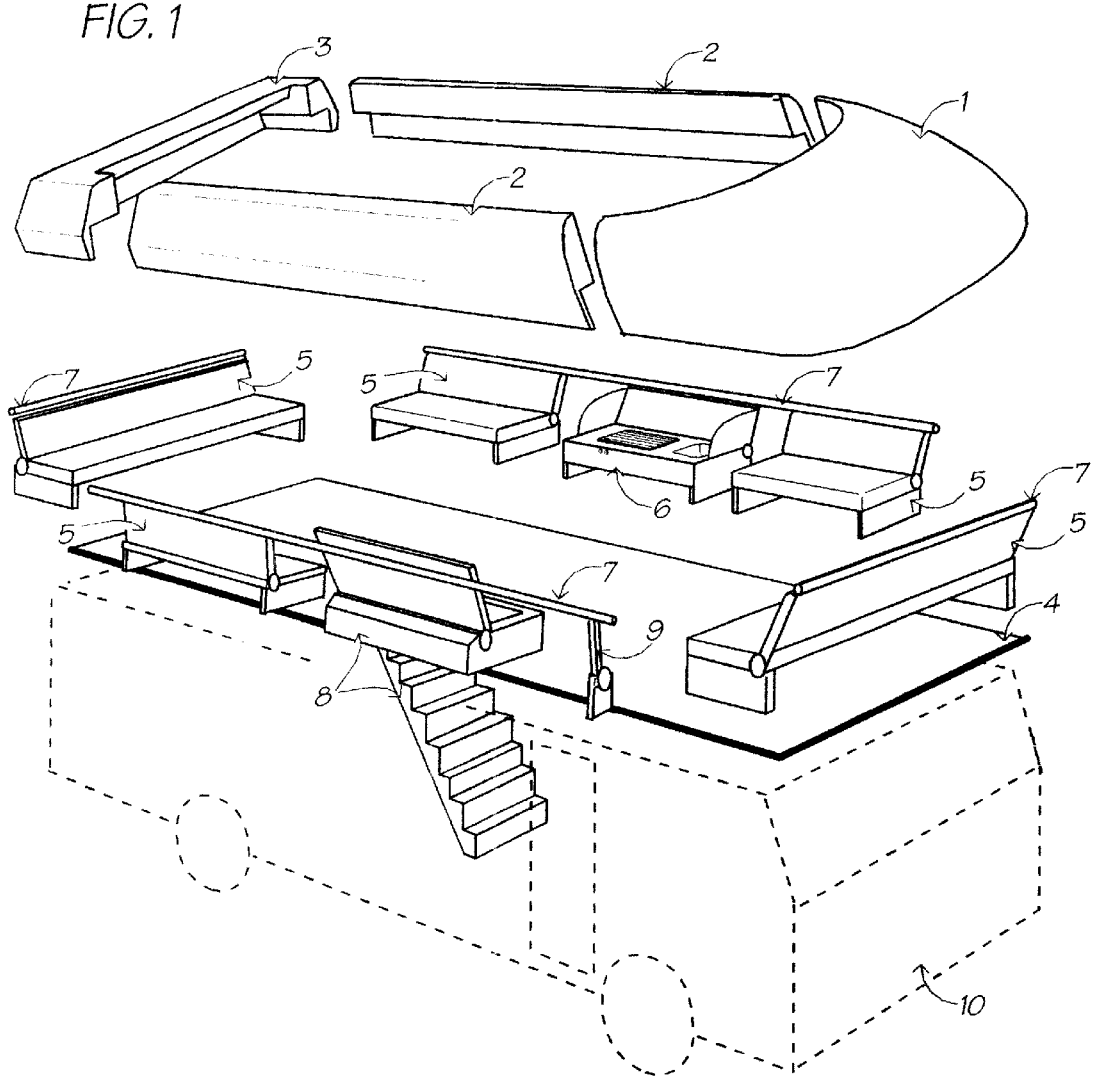
FIG. 1 is an exploded perspective view of one embodiment of the invention depicting representative folding rooftop furnishings, folding safety handrails, stanchions, retractable stair hatchway, seamless rooftop deck, and streamline cowlings on a typical motorhome rooftop (motorhome shown in broken lines)

With reference to FIG. 1, an exploded view of a streamline rooftop deck system for motorhomes as they would be assembled, the first embodiment of the present invention shown comprising an adjustable front streamline cowling 1, a plurality of adjustable center section streamline cowlings 2, an adjustable rear streamline cowling 3, a seamless rooftop deck 4, a plurality of folding sofas 5, a barbecue console 6, a plurality of folding safety handrails 7, a retractable stair hatchway 8, and a folding stanchion 9, all permanently affixed to the roof of a typical motorhome (shown in broken line) 10, with these elements fabricated by any suitable process from a plurality of aesthetically pleasing materials that are suitable for installation on a motorhome, e.g., metals, plastics, composites, fabrics, moldings, castings. The number and types of units shown depict a typical assembly, whereas specific assemblies omit, add, or modify units as suitable for application to the intended motorhome.

The folding safety handrails 7 are affixed to the top back(s) of the folding sofa(s) 5 and the folding stanchion 9 along each perimeter rooftop edge of the motorhome 10 thereby providing an area fully or partially enclosed by safety handrails on the rooftop. The hatchway 8 folding hatch lid and the barbecue console 6 folding lid operate independently of the safety handrails 7 when the handrails are in their UP position, and are automatically closed when the safety handrails are moved to their DOWN position for travel.

The seamless rooftop deck 4, in the preferred embodiment is a one-piece seamless fiber-resin composite sheet of suitable thickness, length & width to cover the roof of a typical motorhome, and comprises a plurality of seamless integral translucent skylights located in locations suitable for the motorhome to which it is affixed. While FIG. 1 shows the seamless rooftop deck 4 in the exploded view, it may be omitted where a suitable rooftop exists on the motorhome to which the present invention is assembled.

Figure 2:
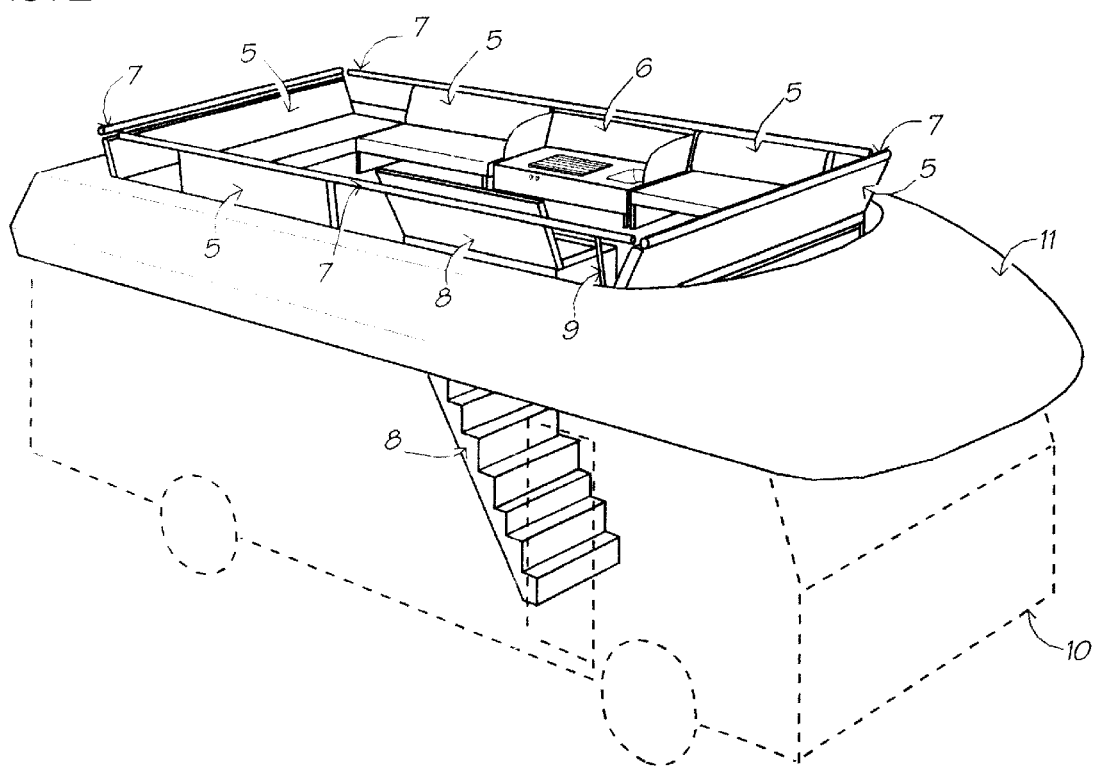
FIG. 2 is a perspective view depicting the elements of the FIG. 1 view in their UP position.

FIG. 2 perspective illustrates an embodiment of the invention assembled upon a typical motorhome, with the safety handrails and folding rooftop furnishings in the UP position for use. While the preferred embodiment depicts the streamline cowling 11, as a plurality of separate components (front streamline cowling, center section streamline cowlings, and rear streamline cowling), any number of elements, including a one-piece streamline cowling, and an extension of the motorhome sides to form a streamline cowling are comprised within the present invention. The stairway of the retractable stair hatchway 8 is shown in the lowered position for use. While the preferred embodiment depicts the stairway as retractable, the present invention is not limiting on the stairway, and comprises the stairway as retractable or as permanently fixed whichever is suitable for the motorhome to which it is assembled.

Figure 3:
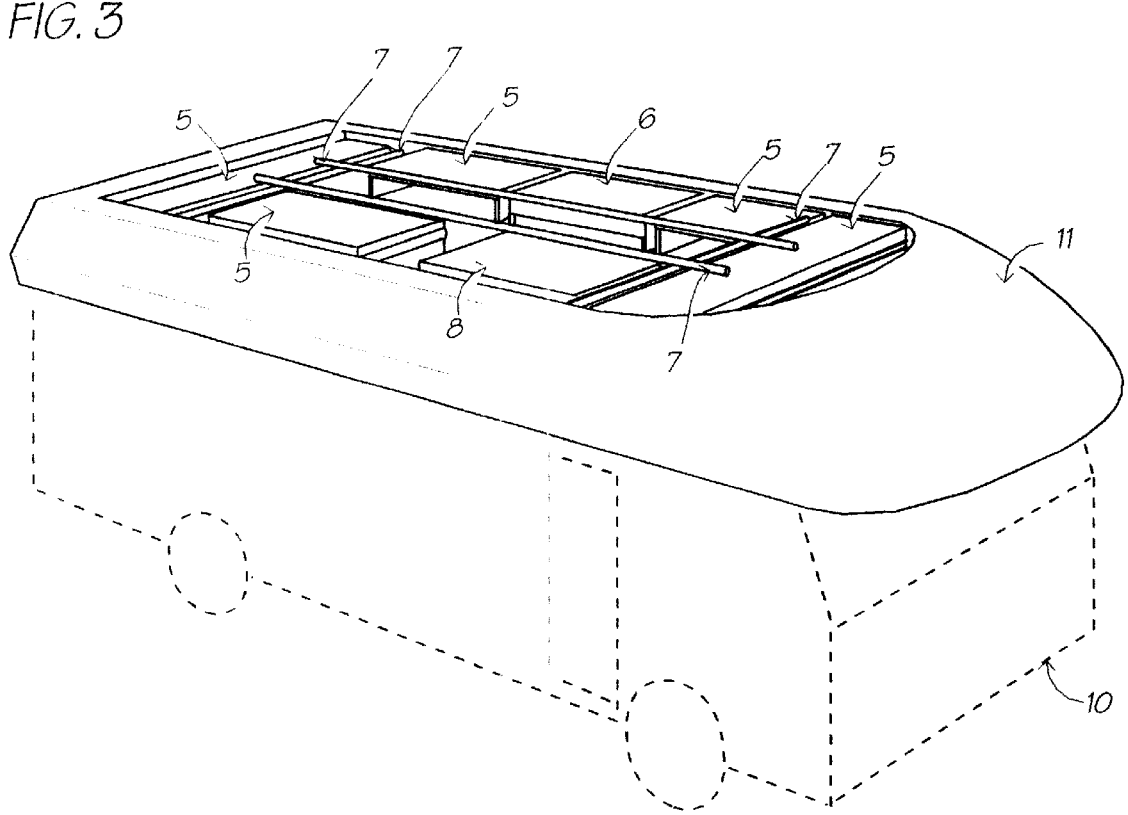
FIG. 3 is a perspective view depicting the elements of the FIG. 1 view in their DOWN for travel position.

FIG. 3 perspective illustrates an embodiment of the invention assembled upon a typical motorhome, with the safety handrails and folding rooftop furnishings in the DOWN position for travel. The safety handrails 7 are shown in the preferred embodiment to have the lateral safety handrails (running with the length of the motorhome) overlapping the crosswise safety rails to allow the automatic raising of the handrail over the hatchway 8 by opening the hatch lid.

Figure 4:
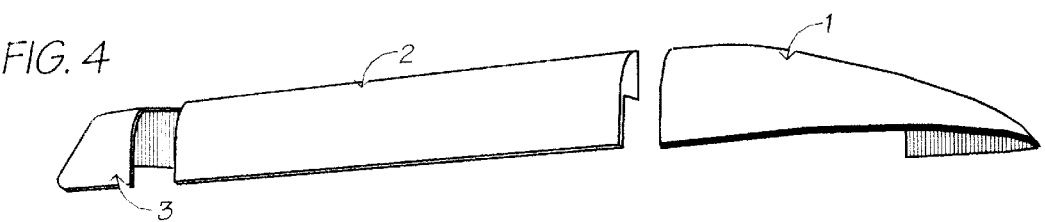
FIG. 4 is a perspective view of the streamline cowlings shown in FIG. 1, showing the center sections of the cowlings in a long length to fit long motorhomes.
Figure 5:
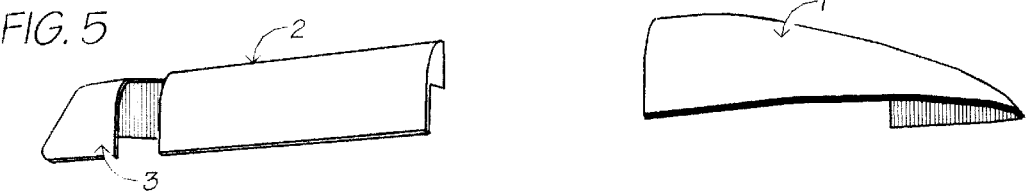
FIG. 5 is a perspective view of the streamline cowlings shown in FIG. 1, showing the center sections of the cowlings in a shorter length to fit shorter motorhomes.

FIG. 4 and FIG. 5 perspective drawings illustrate the variable lengths of the center section streamline cowlings 2 to fit a plurality of motorhome lengths and sizes. A longer length center section streamline cowling 2 is shown in FIG. 4 and a shorter length center section streamline cowling 2 is shown in FIG. 5.

Figure 6:
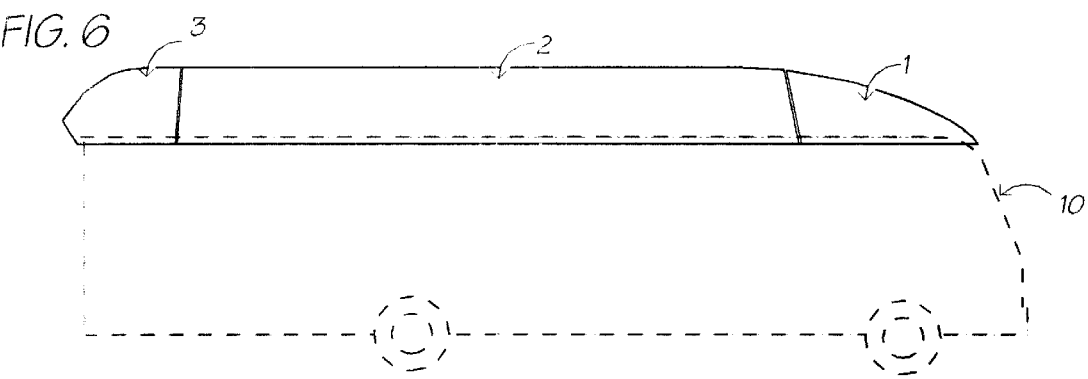
FIG. 6 is a elevation view of the streamline cowlings shown in FIG. 1 affixed atop a typical motorhome (motorhome shown in broken line).
Figure 7:
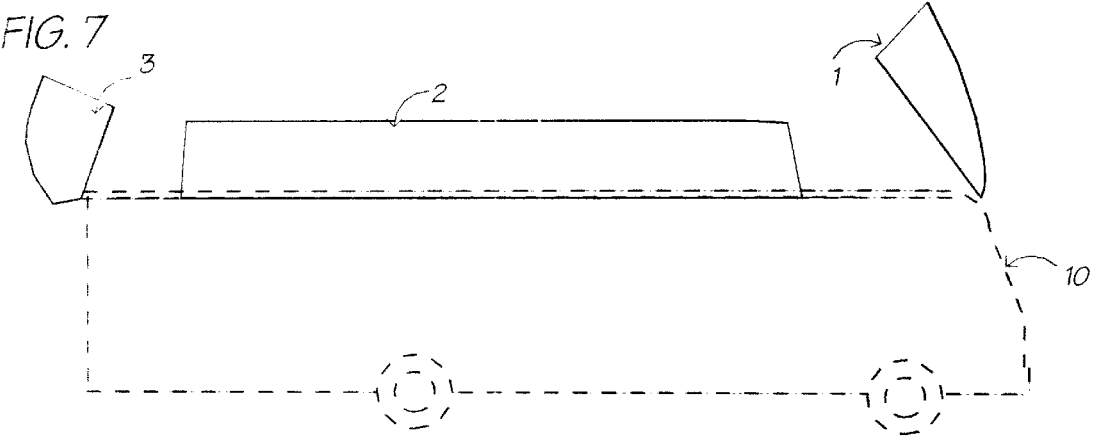
FIG. 7 is a elevation view of the streamline cowlings shown in FIG. 1 affixed atop a typical motorhome (motorhome shown in broken line), where a front and a rear cowling are tilted upward.

FIG. 6 and FIG. 7 elevation drawings illustrate the front streamline cowling 1 and the rear streamline cowling 3 in the preferred embodiment where they tilt upward for access to rooftop equipment (e.g., air-conditioners, satellite dishes, antennas, storage units, ventilators, and the like). FIG. 6 shows the front and rear cowlings in the DOWN position for travel, and FIG. 7 shows the front and rear cowlings in the OPEN position for access to rooftop deck equipment. While the preferred embodiment depicts the front and rear cowlings as openable, both fixed and openable embodiments are comprised within the present invention.

Figure 8:
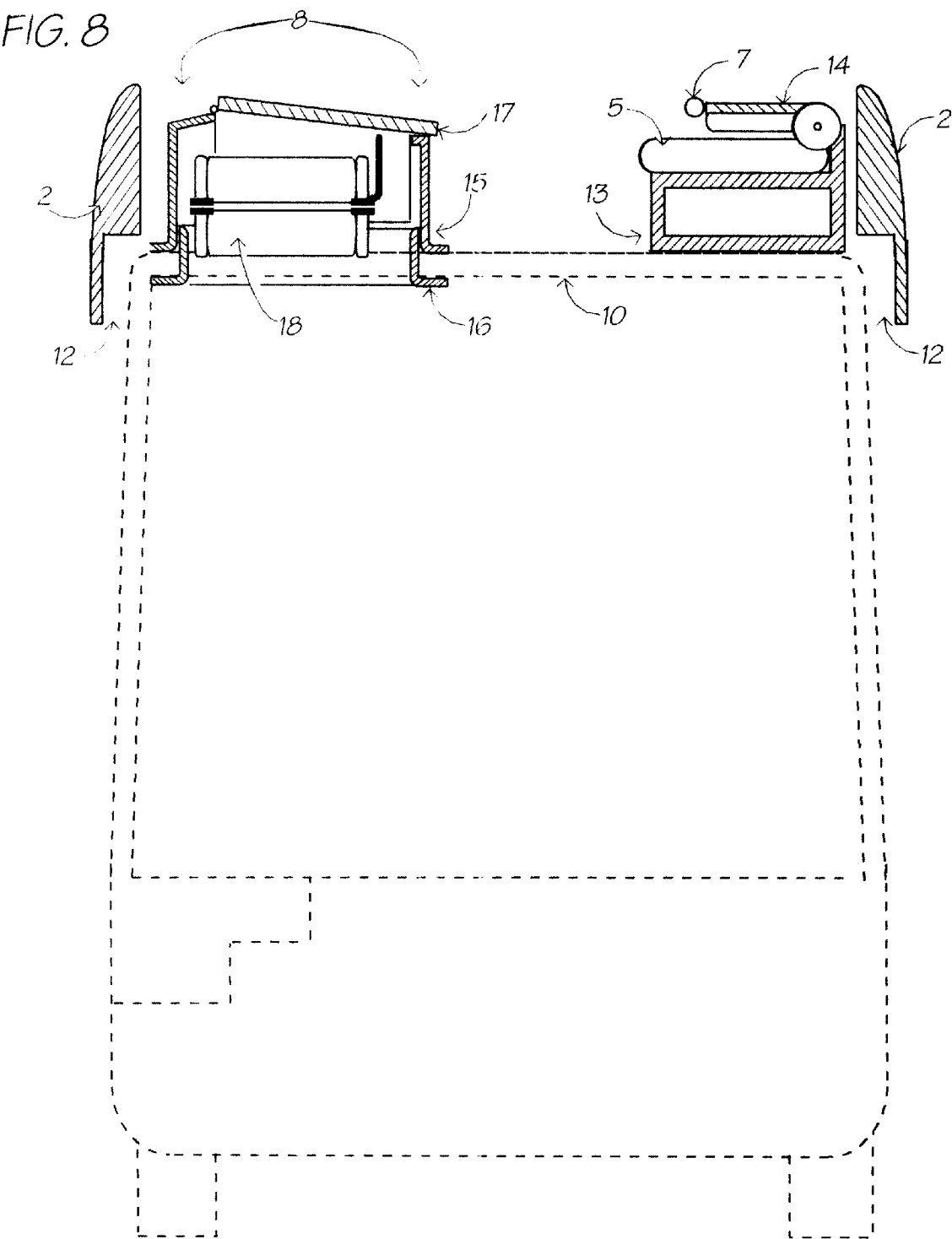
FIG. 8 is a sectional view across the rooftop through the streamline cowlings, through the retractable stair hatchway, and through a folding sofa atop the motorhome in FIG. 1 depicting the hatchway, the folding sofa, the folding safety handrails in their DOWN position for travel, and the retractable stairway in the retracted up position for travel.

FIG. 8 drawing cross-section across the motorhome 10 through the center section streamline cowlings 2 and through the retracting stair hatchway 8, shows the water-fall open space 12 between the rooftop perimeter and the bottom edges of the streamline cowlings which space allows water and debris to run off the top of the motorhome, and allows air to circulate under the rooftop furnishings to the rooftop equipment and rooftop vents. The folding sofa 5 is affixed to the motorhome rooftop 10 and to the cowling 2 thereby affixing the cowling to the motorhome rooftop. The folding sofa frame 13 is open from the bottom of the seat to the roof surface on the side facing toward the center of the motorhome and on the side facing toward the perimeter edge of the motorhome, to allow water and debris to flow through to the water-fall 12 open space over the edge of the rooftop. In the preferred embodiment, the water-fall 12 runs along the entire perimeter between the cowlings and the motorhome rooftop. The present invention does not limit running the water-fall 12 around the entire perimeter, and comprises running the water-fall 12 in selected areas of the rooftop perimeter as suitable to the motorhome.

Also the FIG. 8 drawing cross-section shows the retractable stair hatchway 8 attachment to the motorhome rooftop 10, where the hatchway coaming 15 is a tall vertical section with a perpendicular horizontal flange at the rooftop forming an I-beam like structure reinforcing the roof span interruption of the hatch opening in the continuous rooftop structure of the motorhome. A mating structural angle structure 16 is affixed to the underside of the motorhome structural roof and is affixed to the coaming 15, to encapsulate the motorhome roof structure with the structure of the hatchway. The hatch lid 17 is shown in the closed (DOWN) position, and the stairs 18 are shown in the retracted (UP) position.

Additionally, the FIG. 8 drawing cross-section shows the sofa 5 with the back folded DOWN 14 with the safety handrail 7. The present invention encompasses the retractable stair hatchway and the fold-flat rear stairway, which stairways can be used individually as suitable to the motorhome, or both stairways can be used to provide an indoor and an outdoor stairway.

Figure 9:
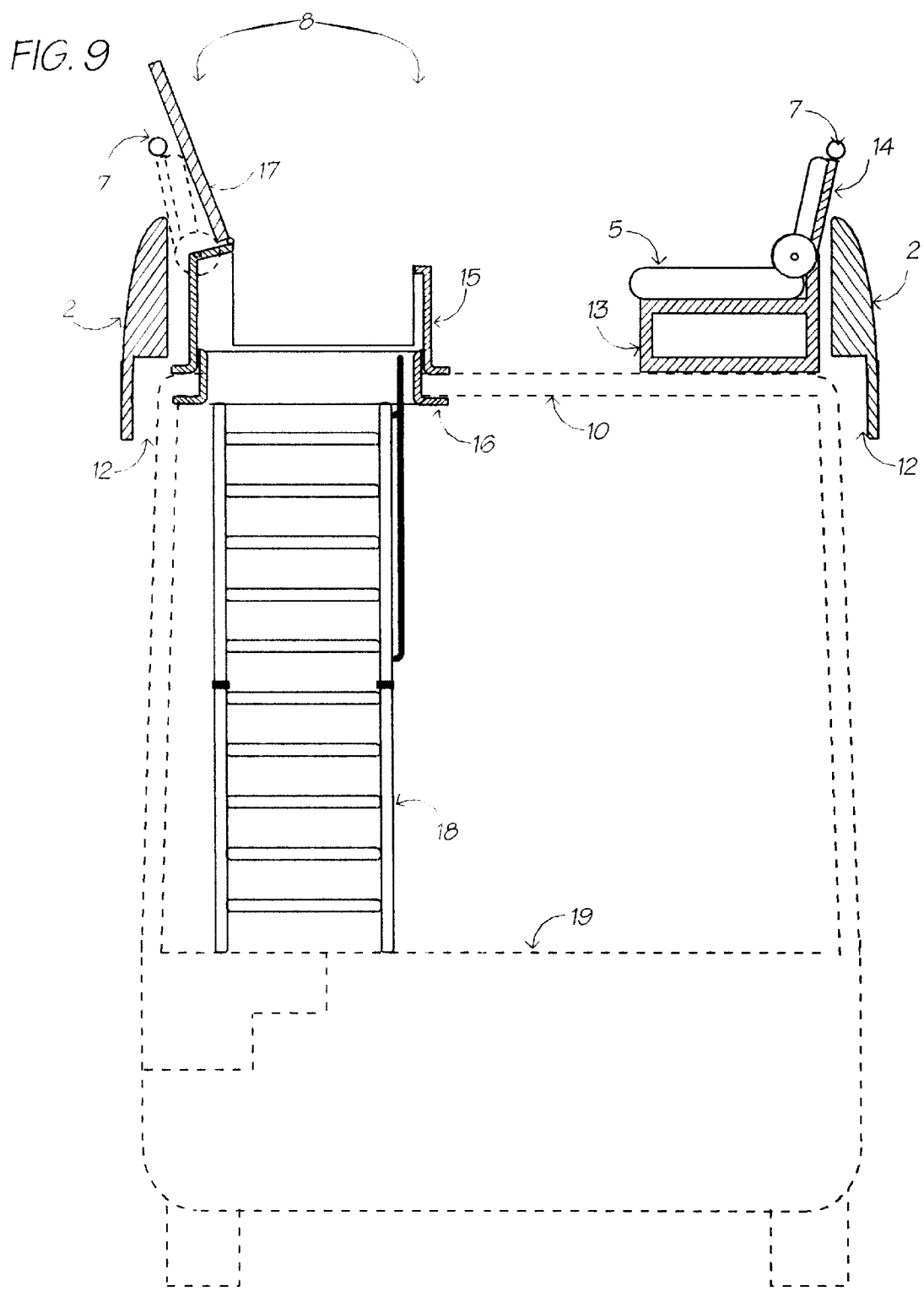
FIG. 9 is a sectional view across the rooftop through the streamline cowlings, through the retractable stair hatchway, and through the folding sofa atop the motorhome of FIG. 1 depicting the hatchway, the folding sofa, the folding safety handrails in their UP position for use, and the retractable stairway in the extended down position for use.

FIG. 9 shows the hatchway 8 with the hatch-lid 17 in the open (UP) position and the stairway 18 extended down to the motorhome 10 interior floor surface 19. The sofa 5 is shown with the back 14 and the safety handrail 7 folded to the UP position.

Figure 14:
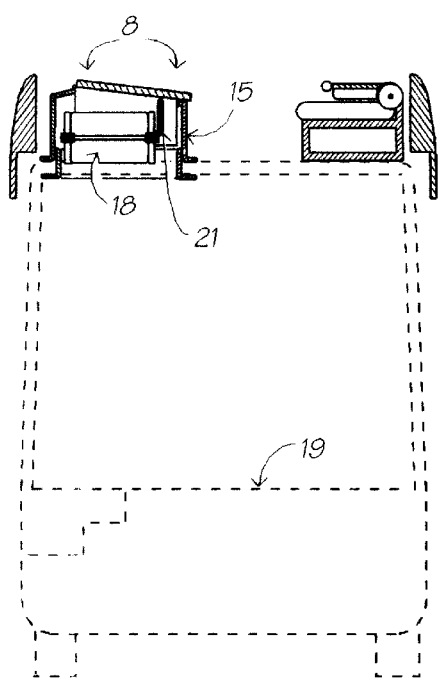
FIG. 14 is a retractable stairway operational sectional view across the rooftop through the streamline cowlings, through the retractable stair hatchway, and through the folding sofa atop the motorhome of FIG. 9 depicting the hatchway, the folding sofa, the folding safety handrails in their DOWN position for travel, and the retractable stairway in the fully retracted position for travel.

FIGS. 10, 12, and 14 drawings are the same cross-section as FIGS. 8 & 9 through the retracting stair hatchway 8, which show the operation phases of the retracting stairs and an attached stair safety handrail 21. FIG. 10 shows the stairway 18 and the stair safety handrail 21 extended down to the motorhome interior floor surface 19. The stairway 18 is hinged 20 to fold the stairs above the ceiling within the hatchway coaming area 15. FIG. 12 shows the stairway 18 and the stair safety handrail 21 partially retracted. FIG. 14 shows the stairway 18 and the stair safety handrail 21 fully retracted above the ceiling within the hatchway coaming 15.

Figure 15:
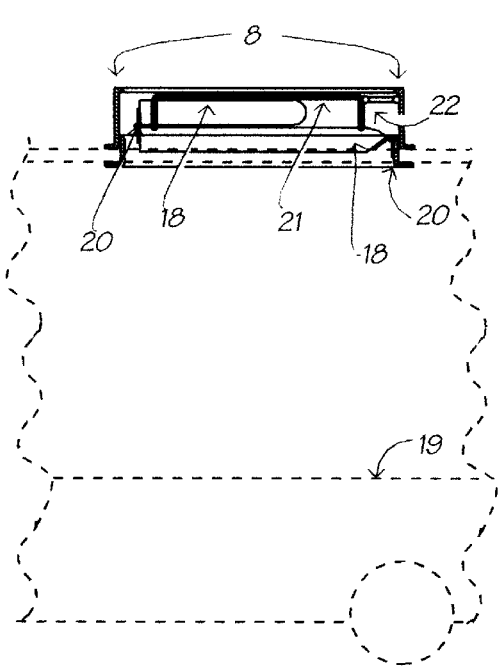
FIG. 15 is a retractable stairway operational sectional side view lengthwise through the retractable stair hatchway of FIG. 14 depicting the retractable stairway in the fully retracted position for travel.

FIGS. 11, 13, and 15 drawings are elevations for the cross-section FIGS. 10, 12 & 14 showing the operation phases of the retracting stairs and an attached stair safety handrail 21. FIG. 11 shows the stairway 18 and the stair safety handrail 21 extended down to the motorhome interior floor surface 19. The stairway 18 is hinged 20 to fold the stairs above the ceiling within the hatchway coaming area 15. FIG. 13 shows the stairway 18 and the stair safety handrail 21 partially retracted. FIG. 15 shows the stairway 18 and the stair safety handrail 21 fully retracted above the ceiling within the hatchway coaming 15.

Figure 22:
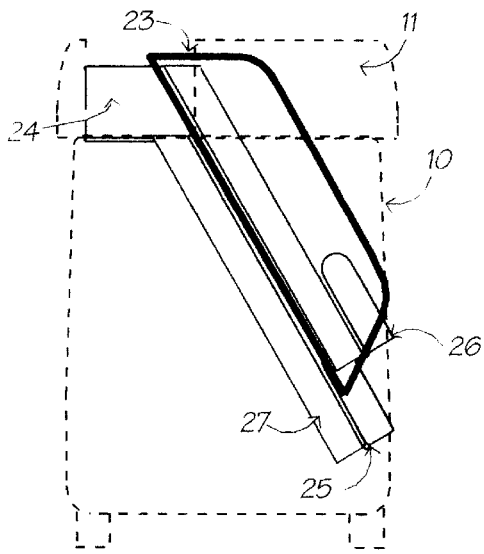
FIG. 22 is a rear view of a motorhome with the rear streamline cowling (motorhome & cowling shown in broken line) showing the rear fold-flat stairway fully folded flat against the rear of the motorhome.
Figure 23:
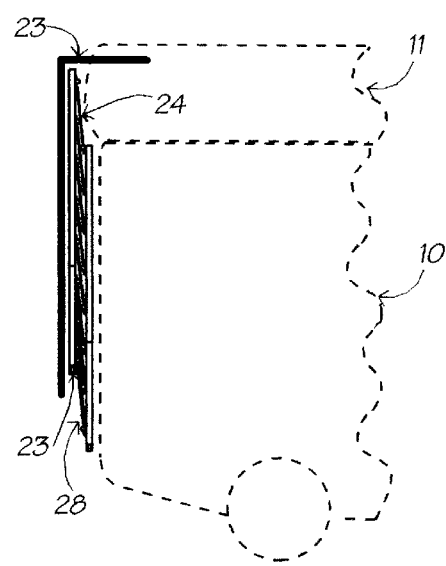
FIG. 23 is an elevation of the rear end of a motorhome with the rear streamline cowling (motorhome & cowling shown in broken line) showing the rear fold-flat stairway of FIG. 22 fully folded flat against the rear of the motorhome.
Figure 24:
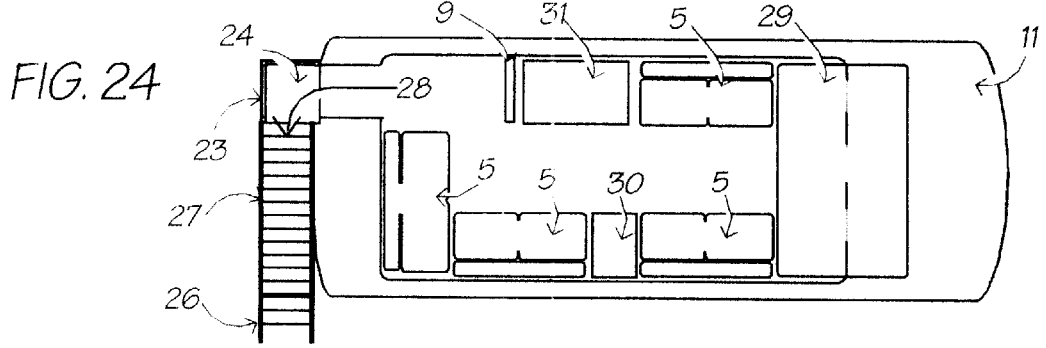
FIG. 24 is deck plan view of a short in length motorhome with the streamline cowling showing the rear fold-flat stairway, folding sofas, a folding barbecue console, a folding food preparation console, and a folding sofa-bed.

FIGS. 16 through 24 depict a fold-flat stairway with a sliding handrail on the rear of a typical motorhome 10 with streamline cowling 11. FIGS. 16, 18, 20, and 22 are exterior end views of the motorhome with the streamline cowling and the fold-flat stairway. FIGS. 17, 19, 21, and 23 are elevation views of FIGS. 16, 18, 20, and 22. FIG. 24 is a plan view of fold-flat stairway on the rear end of the motorhome.

Figure 16:
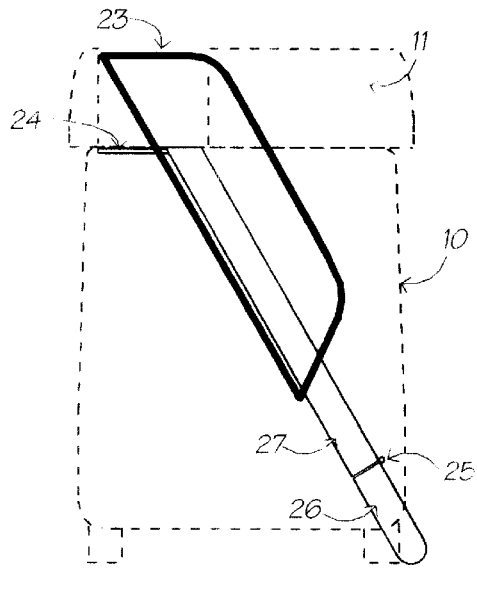
FIG. 16 is a rear view of a motorhome with the rear streamline cowling (motorhome & cowling shown in broken line) showing a rear fold-flat stairway in the DOWN position for use.
Figure 17:
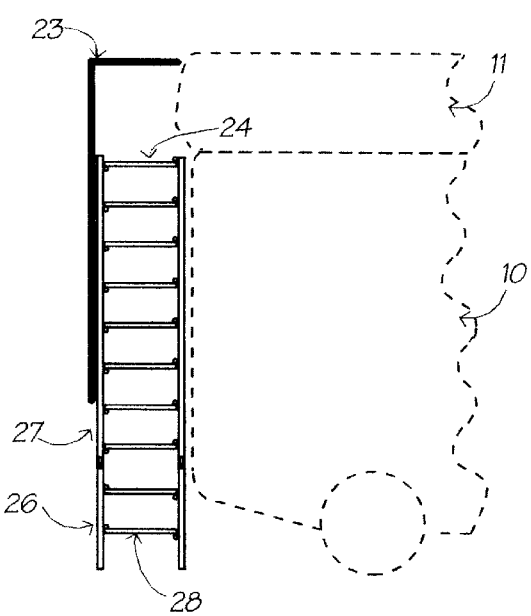
FIG. 17 is an elevation of the rear end of a motorhome with the rear streamline cowling (motorhome & cowling shown in broken line) showing the rear fold-flat stairway of FIG. 16 in the DOWN position for use.

FIGS. 16 and 17 show the fold-flat stairway 27 in the DOWN position with a hinged fold-down stair section 26 fully extended to ground level for use. The top rail of the sliding handrail 23 is extended well above the top surface of the motorhome rooftop, and a folding platform stair landing 24 at the top of the stairway is adjacent to the edge of the rooftop. The platform stair landing 24 and the treads 28 on the fold-flat stairway 27 are affixed to the outboard stairway sides with hinges on the tread bottom edges, and affixed to the inboard stairway sides with hinges on the tread top edges. The stair treads 28 on the hinged fold-down stair section 26 are affixed to the outboard stairway sides with hinges on the tread top edges, and affixed to the inboard stairway sides with hinges on the tread bottom edges.

Figure 18:
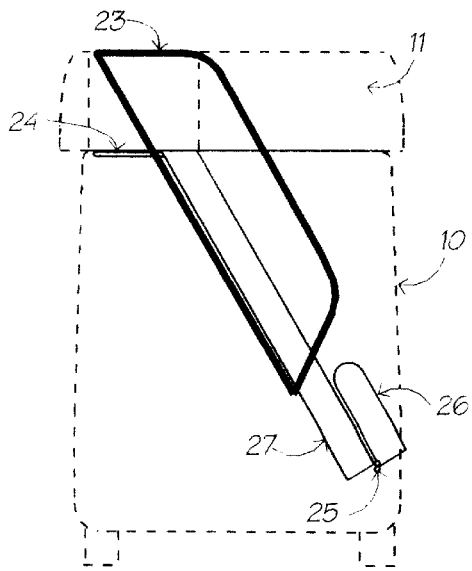
FIG. 18 is a rear view of a motorhome with the rear streamline cowling (motorhome & cowling shown in broken line) showing a rear fold-flat stairway with a bottom stair section folded upward.
Figure 19:
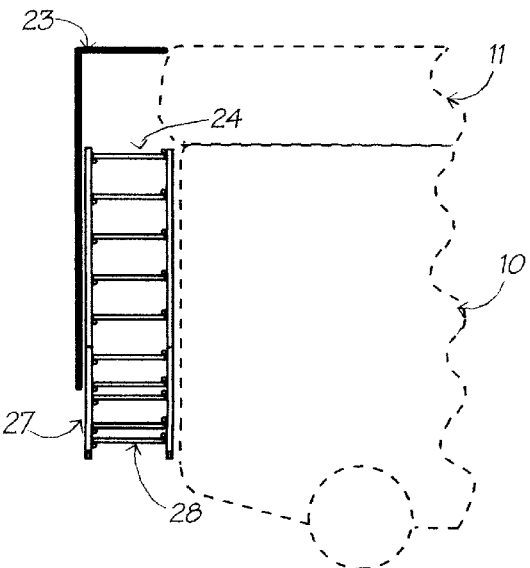
FIG. 19 is an elevation of the rear end of a motorhome with the rear streamline cowling (motorhome & cowling shown in broken line) showing the rear fold-flat stairway of FIG. 18 with the bottom stair section folded upward.

FIGS. 18 and 19 show the same fold-flat stairway 27 with the hinged fold-down stair section 26 raised up and folded upon the stairway.

Figure 20:
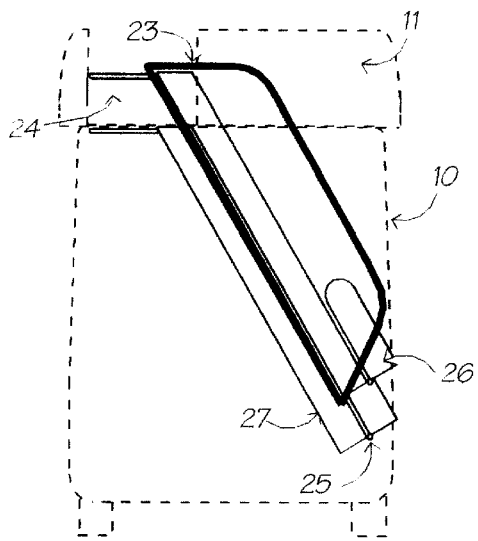
FIG. 20 is a rear view of a motorhome with the rear streamline cowling (motorhome & cowling shown in broken line) showing the rear fold-flat stairway partially folded against the rear of the motorhome.
Figure 21:
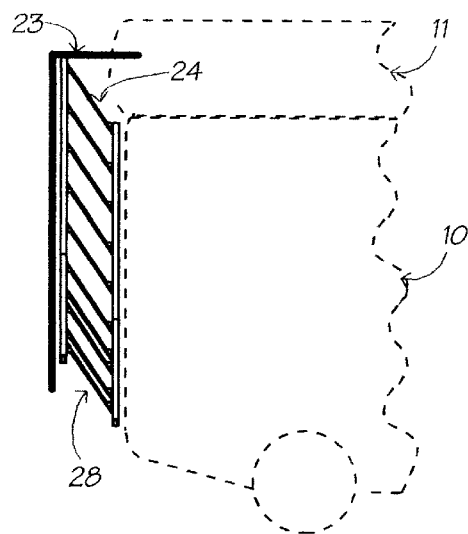
FIG. 21 is an elevation of the rear end of a motorhome with the rear streamline cowling (motorhome & cowling shown in broken line) showing the rear fold-flat stairway of FIG. 20 partially folded against the rear of the motorhome.

FIGS. 20 and 21 show the same fold-flat stairway 27 with the hinged fold-down stair section 26 raised up and folded upon the stairway, with the sliding handrail 23 slid to the DOWN position on the stairway, and the outboard side of the stairway lifted up and pivoting on the tread 28 and platform 24 hinges.

FIGS. 22 and 23 show the same fold-flat stairway 27 folded flat against the back of the motorhome for travel. Also shown is the platform stair landing 24 folded flat against the streamline cowling 11 entrance opening, closing the entrance off for travel.

FIG. 24 plan view drawing shows the same fold-flat stairway 27, the sliding handrail 23, the stair landing platform 24, and the fold-down stair section 26 in the DOWN position traversing from the motorhome rooftop to ground level.

FIGS. 24 through 37 are plan views of typical motorhome roofs with streamline cowlings 11 affixed showing a plurality of folding rooftop furnishings, hatchways, and stairway in several arrangements, sizes, combinations and locations illustrating various embodiments of the present invention, and the modularity of the folding rooftop furnishings.

FIG. 24 plan view depicts the streamline cowling 11 with an opening in the rear accessing the fold-flat rear stairway 27. Additionally, FIG. 24 depicts sofas 5, the stanchion 9, a folding-sofa with a bed-sized seat (folding rooftop sofa-bed 29), a folding barbecue console 31, and a folding food preparation console 30. The folding barbecue console 31 has an open flow-through frame similar to the sofas and comprises a drop-in barbecue, a counter top, fold-out wind screens on each side of the console, and a fold-down table-top cover for travel which is automatically closed when the adjacent sofas and safety handrails are closed to the DOWN position for travel. The folding food preparation console 30 has an open flow-through frame similar to the sofas and comprises, a counter top, a sink, and a fold-down table-top cover for travel which is automatically closed when the adjacent sofas and safety handrails are closed to the DOWN position for travel. The folding rooftop sofa-bed 29 is shown in this embodiment with the bed-sized seat partially located behind the folding back, and located below the front streamline cowling which streamline cowling lifts upward for use of the bed.

Figure 25:
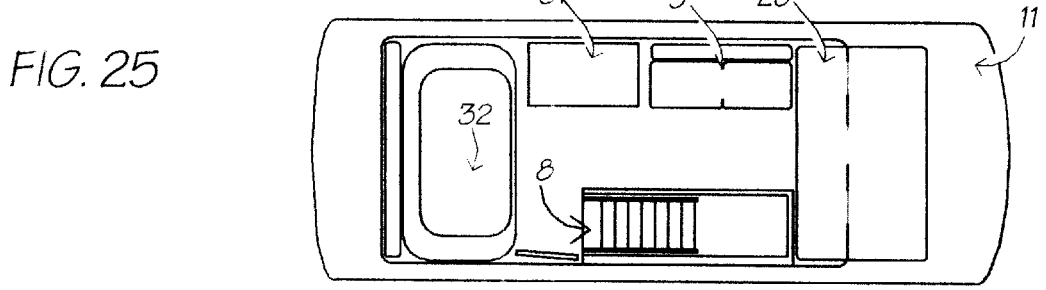
FIG. 25 is deck plan view of a short in length motorhome with the streamline cowling showing a folding spa, the retracting stair hatchway, the folding sofa, the folding barbecue console, and the folding sofa-bed.

FIG. 25 plan view depicts the streamline cowling 11, and a folding spa 32, the sofa 5, the folding rooftop sofa-bed 29, the folding barbecue console 31, and the retractable stair hatchway 8. The folding spa 32 comprises a molded bathing tub with spa plumbing, a folding sofa back cushion rest, and a folding safety handrail.

Figure 26:
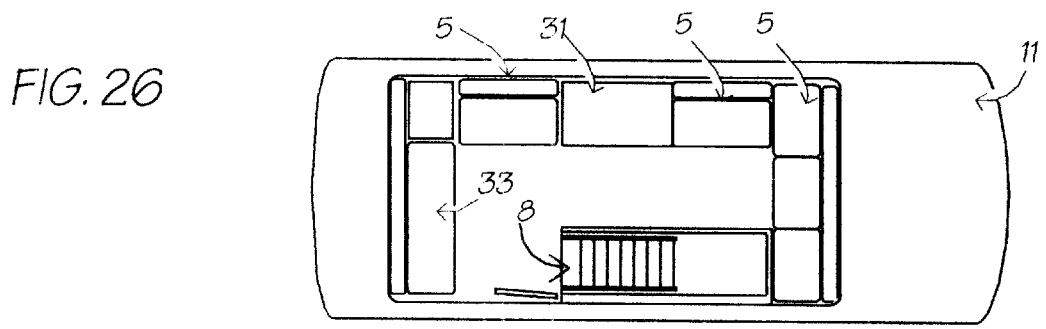
FIG. 26 is deck plan view of a short in length motorhome with the streamline cowling showing a folding sofa-table, folding sofas, the retracting stair hatchway, and the folding barbecue console.

FIG. 26 plan view depicts the streamline cowling 11, and a sofa with a table 33, the sofas 5, the folding barbecue console 31, and the retractable stair hatchway 8.

Figure 27:
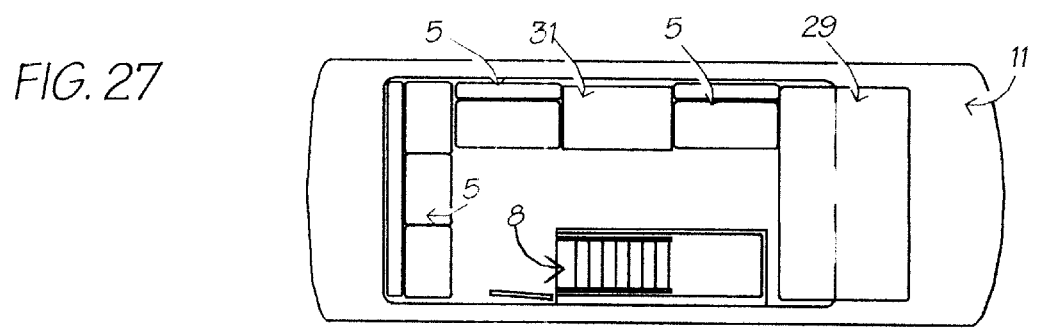
FIG. 27 is deck plan view of a short in length motorhome with the streamline cowling showing folding sofas, the retracting stair hatchway, the folding barbecue console, and the folding sofa-bed.

FIG. 27 plan view depicts the streamline cowling 11, the sofas 5, the folding rooftop sofa-bed 29, the folding barbecue console 31, and the retractable stair hatchway 8.

Figure 28:
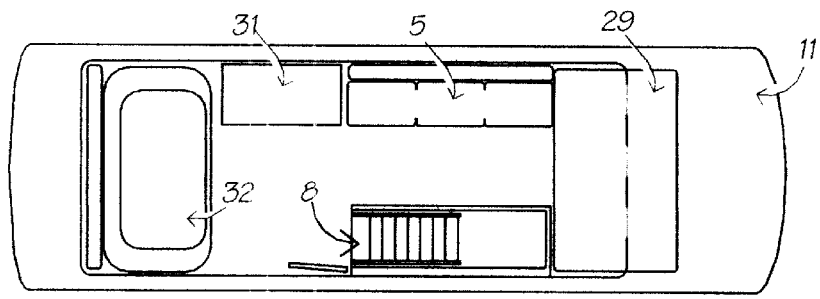
FIG. 28 is deck plan view of a medium length motorhome with the streamline cowling showing the folding spa, the retracting stair hatchway, the folding barbecue console, and the folding sofa-bed.

FIG. 28 plan view depicts the streamline cowling 11, and the folding spa 32, the sofa 5, the folding rooftop sofa-bed 29, the folding barbecue console 31, and the retractable stair hatchway 8.

Figure 29:
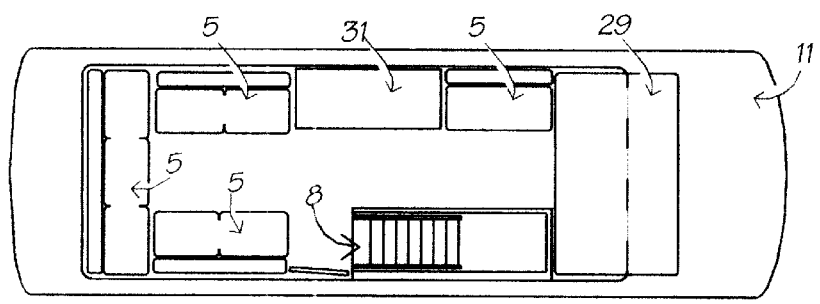
FIG. 29 is deck plan view of a medium length motorhome with the streamline cowling showing the folding sofas, the retracting stair hatchway, the folding barbecue console, and the folding sofa-bed.

FIG. 29 plan view depicts the streamline cowling 11, and the sofas 5, the folding rooftop sofa-bed 29, the folding barbecue console 31, and the retractable stair hatchway 8.

Figure 30:
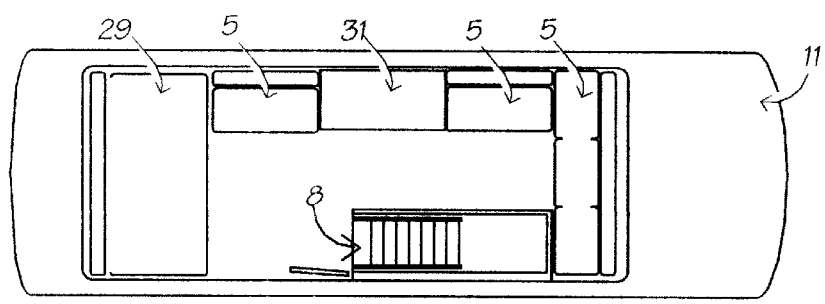
FIG. 30 is deck plan view of a medium length motorhome with the streamline cowling showing the folding sofa-bed, the retracting stair hatchway, the folding barbecue console, and folding sofas.

FIG. 30 plan view depicts the streamline cowling 11, and the sofas 5, the folding rooftop sofa-bed 29, the folding barbecue console 31, and the retractable stair hatchway 8.

Figure 31:
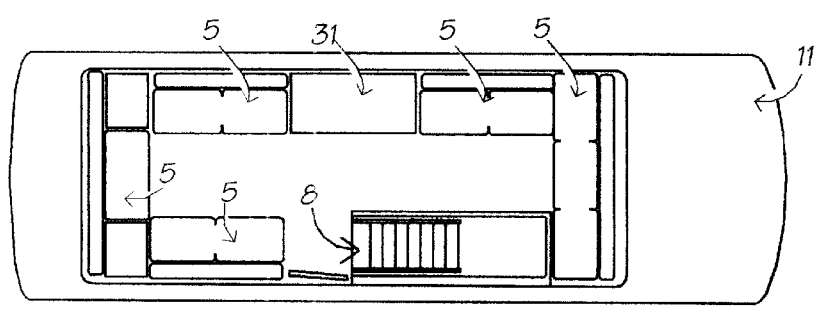
FIG. 31 is deck plan view of a medium length motorhome with the streamline cowling showing the retracting stair hatchway, the folding barbecue console, and folding sofas.

FIG. 31 plan view depicts the streamline cowling 11, and the sofas 5, the folding barbecue console 31, and the retractable stair hatchway 8.

Figure 32:
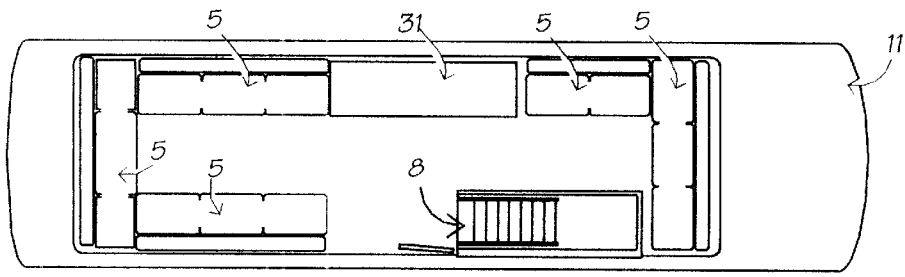
FIG. 32 is deck plan view of a medium-long length motorhome with the streamline cowling showing the folding sofas, the retracting stair hatchway, and the folding barbecue console.

FIG. 32 plan view depicts the streamline cowling 11, and the sofas 5, the folding barbecue console 31, and the retractable stair hatchway 8.

Figure 33:
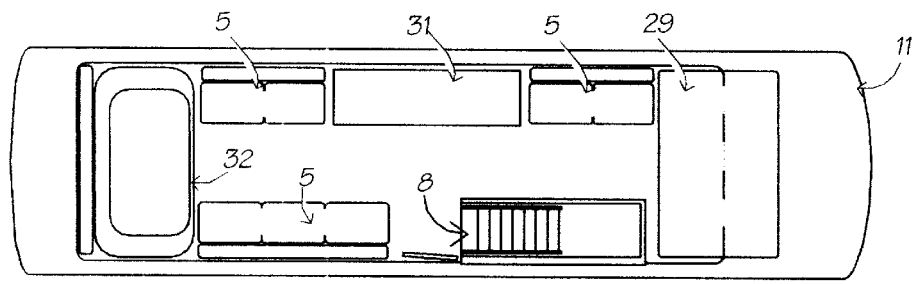
FIG. 33 is deck plan view of a medium-long length motorhome with the streamline cowling showing the folding spa, folding sofas, the retracting stair hatchway, the folding barbecue console, and the folding sofa-bed.

FIG. 33 plan view depicts the streamline cowling 11, and the folding spa 32, the sofas 5, the folding rooftop sofa-bed 29, the folding barbecue console 31, and the retractable stair hatchway 8.

Figure 34:
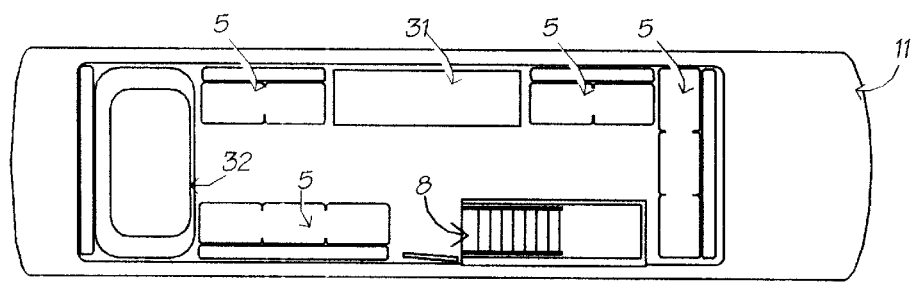
FIG. 34 is deck plan view of a medium-long length motorhome with the streamline cowling showing the folding spa, folding sofas, the retracting stair hatchway, and the folding barbecue console.

FIG. 34 plan view depicts the streamline cowling 11, and the folding spa 32, the sofas 5, the folding barbecue console 31, and the retractable stair hatchway 8.

Figure 35:
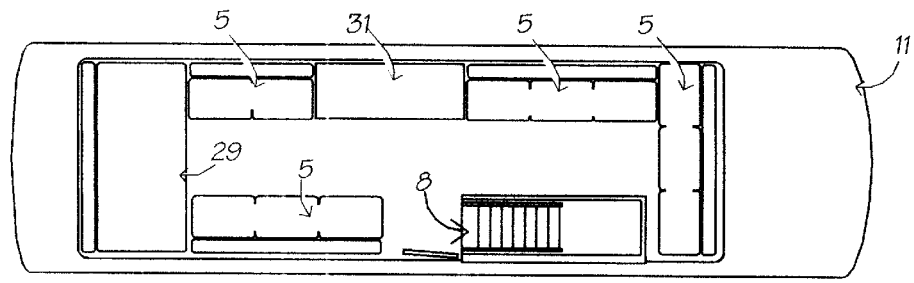
FIG. 35 is deck plan view of a medium-long length motorhome with the streamline cowling showing the folding sofa-bed, folding sofas, the retracting stair hatchway, and the folding barbecue console.

FIG. 35 plan view depicts the streamline cowling 11, and the sofas 5, the folding rooftop sofa-bed 29, the folding barbecue console 31, and the retractable stair hatchway 8.

Figure 36:
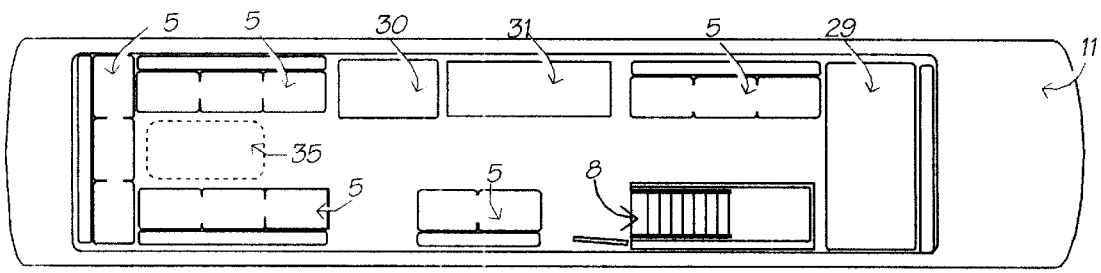
FIG. 36 is deck plan view of a long length motorhome with the streamline cowling showing the folding sofas, the retracting stair hatchway, the folding barbecue console, the folding food preparation console, and the folding sofa-bed.

FIG. 36 plan view depicts the streamline cowling 11, and the sofas 5, the folding rooftop sofa-bed 29, the folding food preparation console 30, the folding barbecue console 31, the retractable stair hatchway 8, and a stowable folding dining table 35. The stowable folding dining table folds down and stows under the rear sofa and rear streamline cowling.

Figure 37:
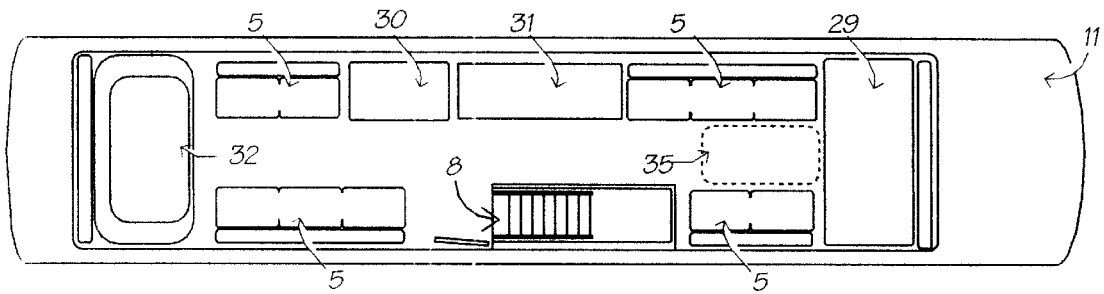
FIG. 37 is deck plan view of a long length motorhome with the streamline cowling showing the folding spa, the folding sofas, the retracting stair hatchway, the folding barbecue console, the folding food preparation console, a folding dining table, and the folding sofa-bed.

FIG. 37 plan view depicts the streamline cowling 11, and the folding spa 32, the sofas 5, the folding rooftop sofa-bed 29, the folding food preparation console 30, the folding barbecue console 31, the retractable stair hatchway 8, and the stowable folding dining table 35.

Figure 38:
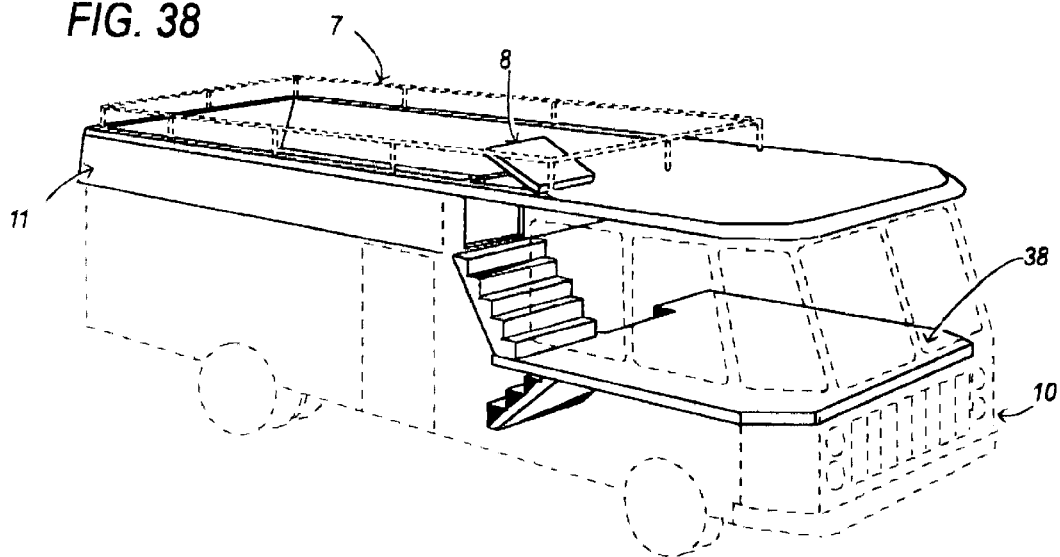
FIG. 38 is a perspective view of an intermediate landing.

FIG. 38 shows a perspective view of the roof deck system atop the middle and rear portion of a motor home with a shortened stairway leading to an intermediate landing 38, where a second stairway then leads down to the main floor of the vehicle.

Figure 39:
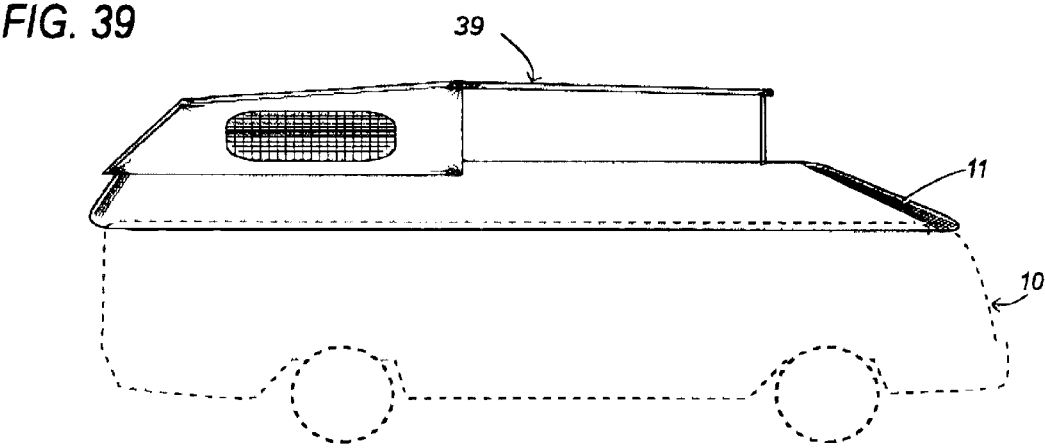
FIG. 39 is a side view of a convertible top.

FIG. 39 is a side view of the roof deck system showing the perimeter enclosure with the invention as typical convertible top 39 in the raised position. The lower edges of the convertible top are secure to the uppermost surface of the roof deck system, rather than to the lower plane of the vehicle's roof as is common with other rooftop tent structures. The convertible top extension canopy is depicted with typical supports at the outermost edges.

While the present invention has been described with respect to the preferred embodiments thereof, it is to be understood that the invention is not limited to such precise forms of the apparatus, and that changes may be made therein without departing from the scope of the invention defined in the appended claims.

What is claimed:

1. A vehicle rooftop deck system comprising:
   a plurality of streamline cowlings enclosing the perimeter of a vehicle rooftop;
   a plurality of rooftop safety handrails which fold down to a low profile for travel, which fold upward for use, which enclose the perimeter of the rooftop when in the upward position, and which affix to the rooftop;
   folding rooftop furniture, backs of which support the safety handrails, and which backs fold down to a low profile for travel and which backs fold upward for use, and furniture under structure which affixes the furniture to the rooftop and which affixes the streamline cowlings to the vehicle rooftop.

2. The system of claim 1, wherein the vehicle is a motor home.

3. The system of claim 1, wherein the vehicle is a travel trailer.

4. The system of claim 1, including a rooftop retractable stair hatchway with a retractable stairway, a retractable stairway safety handrail, and a hatch lid that raises a portion of the safety handrail to an upward position.

5. The system of claim 1 comprising a seamless rooftop deck formed of a fiber and resin composite, the deck overlapping the rooftop exterior perimeter.

6. The system of claim 1 comprising a stairway affixed to the back of the vehicle and including a sliding safety stair handrail, hinged stair treads, a hinged landing at the rooftop, and a fold down stair section extending to a support surface of the vehicle, the stairway folding flat against the back of the vehicle for travel and folding out from the vehicle for use.

7. The system of claim 1 comprising a folding rooftop barbecue console with counter surface, a barbecue, back and side wind protection shields, and a fold-down table top covering the counter surface.

8. The system of claim 1 comprising a folding rooftop food and drink preparation console.

9. The system of claim 1 wherein the furniture comprises a sofa-bed.

10. The system of claim 1, wherein the cowlings provide a flow-through open space between the bottom of the cowlings and the rooftop.

11. The system of claim 10, wherein the cowlings have front and rear sections, the front and rear sections are hinged to open upward for access to rooftop equipment.

12. The system of claim 1, wherein vertical access is by means of an exterior stairway.

13. The system of claim 1, wherein a weather resistant walk-through hatchway on top of the vehicle provides a rooftop enclosure permitting vertical exit and egress between the rooftop by an ascent device from the interior of the vehicle.

14. The system of claim 1, wherein a raising and lowering convertible top unit is fixed in place within the deck.

15. The system of claim 1, wherein a bathing unit is fixed in place on the rooftop within the deck.

16. The system of claim 1, further comprising an intermediate level deck within the interior of the vehicle.

* * * * *